United States Patent
Yasuda et al.

(10) Patent No.: US 9,783,091 B2
(45) Date of Patent: Oct. 10, 2017

(54) SEATBACK FRAME AND RESIN FOR EMPLOYING IN A SEATBACK FRAME

(71) Applicants: NHK SPRING CO., LTD., Yokohama-shi (JP); Toray Industries, Inc., Tokyo (JP)

(72) Inventors: Kenzo Yasuda, Yokohama (JP); Hiroshi Kushiku, Yokohama (JP); Tomoyuki Onodera, Nagoya (JP); Ryotaro Nagao, Tokyo (JP)

(73) Assignees: NHK SPRING CO., LTD., Yokohama-shi (JP); TORAY INDUSTRIES, INC., Tokyo (JP)

( * ) Notice: Subject to any disclaimer, the term of this patent is extended or adjusted under 35 U.S.C. 154(b) by 76 days.

(21) Appl. No.: 14/805,227

(22) Filed: Jul. 21, 2015

(65) Prior Publication Data

US 2016/0023583 A1 Jan. 28, 2016

(30) Foreign Application Priority Data

Jul. 23, 2014 (JP) .................................. 2014-150130

(51) Int. Cl.
- *B60N 2/48* (2006.01)
- *B60N 2/68* (2006.01)
- *B60N 2/64* (2006.01)

(52) U.S. Cl.
CPC ............... *B60N 2/64* (2013.01); *B60N 2/48* (2013.01); *B60N 2/68* (2013.01); *B60N 2/686* (2013.01)

(58) Field of Classification Search
CPC ........................... B60N 2/68; B60N 2002/4897
See application file for complete search history.

(56) References Cited

U.S. PATENT DOCUMENTS 5,626,396 A * 5/1997 Kuragano ............... B60N 2/68
 297/391
5,897,168 A * 4/1999 Bartelt ..................... B60N 2/68
 29/897.2

(Continued)

FOREIGN PATENT DOCUMENTS

CN 102717740 6/2014
EP 0875416 11/1998

(Continued)

OTHER PUBLICATIONS

Extended European Search Report dated Jan. 7, 2016, issued in corresponding EP Application No. 15177630.9-1754.

*Primary Examiner* — Timothy J Brindley
(74) *Attorney, Agent, or Firm* — Knobbe Martens Olson & Bear LLP

(57) ABSTRACT

There is provided a seatback frame integrally formed by resin molding, the seatback frame including: an upper side frame section that includes a headrest retaining portion that extends along a seat width direction; a pair of side frame sections that extend along a seat up-down direction; and a reinforcing section that is formed in the upper side frame section by forming plural recessed portions, at least from the headrest retaining portion to the seat width direction end portion, wherein at least one or more of the recessed portions is open toward the seat rear side so as to provide a first wall face at the seat front side; and another one or more of the recessed portions is open toward the seat front side so as to provide a second wall face at the seat rear side.

7 Claims, 11 Drawing Sheets

(56) References Cited

U.S. PATENT DOCUMENTS

| | | | | |
|---|---|---|---|---|
| 6,378,946 B1* | 4/2002 | Cope | ........................ | B60N 2/64 |
| | | | | 297/452.18 |
| 6,386,638 B1* | 5/2002 | Strauch | .................... | B60N 2/68 |
| | | | | 297/452.18 |
| 9,126,517 B2* | 9/2015 | Yasuda | .................. | B60N 2/686 |
| 9,376,044 B2* | 6/2016 | Fujita | ....................... | B60N 2/68 |
| 9,499,080 B2* | 11/2016 | Line | ........................ | B60N 2/68 |
| 2006/0103223 A1* | 5/2006 | Nagayama | ............... | A47C 7/40 |
| | | | | 297/452.18 |
| 2009/0152929 A1* | 6/2009 | Sung | ........................ | B60N 2/68 |
| | | | | 297/452.18 |
| 2010/0219674 A1* | 9/2010 | Sakkinen | ............. | B60N 2/0722 |
| | | | | 297/452.18 |
| 2012/0306251 A1* | 12/2012 | Arefi | ....................... | B60N 2/68 |
| | | | | 297/354.1 |
| 2013/0038112 A1* | 2/2013 | Gaines | ................. | B60N 2/4808 |
| | | | | 297/452.41 |
| 2014/0284987 A1* | 9/2014 | Yasuda | .................. | B60N 2/686 |
| | | | | 297/452.18 |
| 2014/0375098 A1* | 12/2014 | Kitou | ..................... | B60N 2/682 |
| | | | | 297/391 |
| 2015/0091356 A1* | 4/2015 | Ozaki | .................. | B60N 2/4802 |
| | | | | 297/391 |
| 2015/0210194 A1* | 7/2015 | Furuta | ..................... | B60N 2/48 |
| | | | | 297/391 |
| 2016/0001689 A1* | 1/2016 | Yasuda | .................... | B60N 2/48 |
| | | | | 297/391 |

FOREIGN PATENT DOCUMENTS

| | | |
|---|---|---|
| EP | 2233352 | 9/2010 |
| JP | 2014-004977 A | 1/2014 |
| WO | WO 2009/154909 | 12/2009 |
| WO | WO 2012/032189 | 3/2012 |

* cited by examiner

SEATBACK FRAME AND RESIN FOR EMPLOYING IN A SEATBACK FRAME

CROSS-REFERENCE TO RELATED APPLICATION

This application claims priority under 35 USC 119 from Japanese Patent application No. 2014-150130 filed on Jul. 23, 2014, the disclosure of which is incorporated by reference herein.

BACKGROUND

Technical Field

The present disclosure relates to a seatback frame, and a resin for employing in a seatback frame, of an automobile.

Related Art

From the perspectives of ease of molding and weight reduction, resin-molded seatback frames are being adopted in vehicle seats of automobiles in recent years. Such seatback frames are formed in a substantially rectangular shape in front view, and include an upper side frame section extending along a seat width direction at an upper section of the seatback frame, and a pair of side frame sections extending along a seat up-down direction and connected to both seat width direction end portions of the upper side frame section (see, for example, Japanese Patent Application Laid-Open (JP-A) No. 2014-4977).

When such a seatback frame is applied to a vehicle seat, during a rear-end collision of the vehicle, for example, the head of an occupant collides with a headrest, such that load from the headrest is input to the resin-molded seatback frame, and load is transmitted from the upper side frame section, through the side frame sections, to a seat cushion frame. When this occurs, stress may concentrate at the connecting portions between the upper side frame section and the side frame sections.

Namely, in resin-molded seatback frames, it is desirable to suppress stress from concentrating at the connecting portions between the upper side frame section and the side frame sections when load is input from the headrest.

SUMMARY

In consideration of the above circumstances, the present disclosure provides a seatback frame and a seatback frame resin capable of suppressing stress from concentrating when load from a headrest is input during a collision of the vehicle.

A first aspect of the present disclosure is a seatback frame that configures a frame of a seatback supporting the back of a seated occupant and is integrally formed by resin molding, the seatback frame including: an upper side frame section that includes a headrest retaining portion retaining a headrest, that is positioned at an upper end of the seatback frame, and that extends along a seat width direction; a pair of side frame sections that are connected at an upper side to both seat width direction end portions of the upper side frame section and extend along a seat up-down direction of the seatback frame; and a reinforcing section that is formed in the upper side frame section by forming plural recessed portions extending along a seat front-rear direction, at least from the headrest retaining portion to the seat width direction end portion, wherein at least one or more of the recessed portions is open toward the seat rear side so as to provide a first wall face extending along the seat up-down direction at the seat front side; and another one or more of the recessed portions is open toward the seat front side so as to provide a second wall face extending along the seat up-down direction at the seat rear side.

The seatback frame of the first aspect is integrally formed by resin molding, and includes the upper side frame section including the headrest retaining portion, and the side frame sections connected to both seat width direction end portions of the upper side frame section. Thus moment acts on the headrest retaining portion due to the head of the seated occupant colliding with the headrest from the front during a rear-end collision of the vehicle. Namely, load toward the seat rear side is input to an upper end side of the headrest retaining portion, and load toward the seat front is input to a lower end side of the headrest retaining portion. Thus load input to the upper side frame section from the headrest retaining portion also acts toward the seat rear side at an upper end side, and toward the seat front side at a lower end side, of the upper side frame section.

Moreover, moment in the opposite direction to that in the case of a rear-end collision acts on the headrest retaining portion, due to the head of an occupant seated in a rear passenger seat colliding with the headrest obliquely from the upper rear during a front-end collision of the vehicle. Thus load input to the upper side frame section from the headrest retaining portion acts toward the seat front side at the upper end side, and toward the seat rear side at a lower end side, of the upper side frame section.

The reinforcing section of the upper side frame section is formed with the recessed portion open toward the seat rear side and the recessed portion open toward the seat front side, and includes the wall faces extending along the seat up-down direction at the seat front side and the seat rear side of the upper side frame section. This enables load toward the seat front side acting on the upper side frame section to be distributed at the seat front side wall face, and load toward the seat rear side acting on the upper side frame section to be distributed at the seat rear side wall face. This enables stress to be further suppressed from concentrating at connecting portions between the upper side frame section and the side frame sections during a collision of the vehicle.

A second aspect of the present disclosure is the seatback frame of first aspect, wherein the plural recessed portions are disposed in the reinforcing section along the seat up-down direction, and the recessed portion positioned at an upper end of the reinforcing section is open toward the seat front side with the second wall face formed at the seat rear side.

In the seatback frame of the second aspect, the recessed portion positioned at the seat upper end of the reinforcing section is open toward the seat front side. A protrusion configuring an end portion of the recessed portion is thereby positioned at the seat front side. Namely, there is no protruding object present at the seat rear side of the upper end of the upper side frame section.

A third aspect of the present disclosure is the seatback frame of the first aspect or the second aspect, wherein both the first wall face and the second wall face configuring the plural recessed portions of the reinforcing section are formed continuously from the headrest retaining portion toward the seat width direction end portion.

In the seatback frame of the third aspect, the seat front side wall face and so on, configuring the recessed portions of the reinforcing section, are formed continuously from the headrest retaining portion toward the seat width direction end portion, namely, as far as the connecting portion with each side frame section. Thus load input from the headrest to the upper side frame section during a rear-end collision of the vehicle is further distributed at the wall faces formed continuously from the headrest retaining portion to the connecting portions with the side frame sections, and stress is further suppressed from concentrating at the connecting portions with the side frame sections.

A fourth aspect of the present disclosure is the seatback frame of any one of the first aspect to the third aspect, further including a back face panel section that extends along the seat width direction between the pair of side frame sections, wherein seat width direction end portions of the back face panel section are contiguous to the side frame sections and a seat upper direction end portion of the back face panel section is contiguous to the upper side frame section.

The seatback frame of the fourth aspect includes the back face panel section that is contiguous to both the upper side frame section and the side frame sections, between the pair of side frame sections. Thus when load is input to the headrest retaining portion from the headrest during a collision of the vehicle, part of the load is transmitted from the upper side frame section to the back face panel section. This enables stress to be further suppressed from concentrating at the connecting portions between the upper side frame section and the side frame sections.

A fifth aspect of the present disclosure is a resin for employing in a seatback frame and capable of obtaining a seatback frame that configures a frame of a seatback supporting the back of a seated occupant by integrally molding, the seatback frame including: an upper side frame section that includes a headrest retaining portion retaining a headrest, that is positioned at an upper end of the seatback frame, and that extends along a seat width direction; a pair of side frame sections that are connected at an upper side to both seat width direction end portions of the upper side frame section and extend along a seat up-down direction of the seatback frame; and a reinforcing section that is formed in the upper side frame section by forming plural of recessed portions extending along a seat front-rear direction, at least from the headrest retaining portion to the seat width direction end portion, wherein at least one or more of the recessed portions is open toward the seat rear side so as to provide a first wall face extending along the seat up-down direction at the seat front side; and another one or more of the recessed portions is open toward the seat front side so as to provide a second wall face extending along the seat up-down direction at the seat rear side.

The resin for employing in a seatback frame of the fifth aspect is applied to the seatback frame as described above, thereby enabling a concentration of stress to be effectively suppressed from occurring in the seatback frame, even when load is input from the headrest to the headrest retaining portion during a collision of the vehicle.

A sixth aspect of the present disclosure is a resin for employing in the seatback frame of the fifth aspect, wherein the seatback frame resin is a resin that does not contain fiber material, or contains short fibers or long fibers.

The resin that effectively suppresses stress from concentrating as described above is preferably a resin that does not include fiber material, or that contains short fibers or long fibers.

The first, third, and fourth aspects described above enable stress to be suppressed from concentrating at the connecting portions between the upper side frame section and the side frame sections.

The second aspect described above enables interior fittings requirements (ECE Regulation No. 21) to be satisfied simply by molding the seatback frame of resin, without adding any new configuration elements.

The fifth and sixth aspects described above enable a concentration of stress to be suppressed from occurring in the seatback frame.

BRIEF DESCRIPTION OF THE DRAWINGS

Exemplary embodiments of the present disclosure will be described in detail based on the following figures, wherein.

DETAILED DESCRIPTION

First Exemplary Embodiment

Explanation follows regarding a seatback frame according to a first exemplary embodiment of the present disclosure, with reference to FIG. 1 to FIG. 6, and FIG. 9 to FIG. 11. Note that in each of the drawings, the arrow FR indicates the seat front direction, the arrow UP indicates the seat upper direction, and the arrow W indicates the seat width direction.

Figure 6:
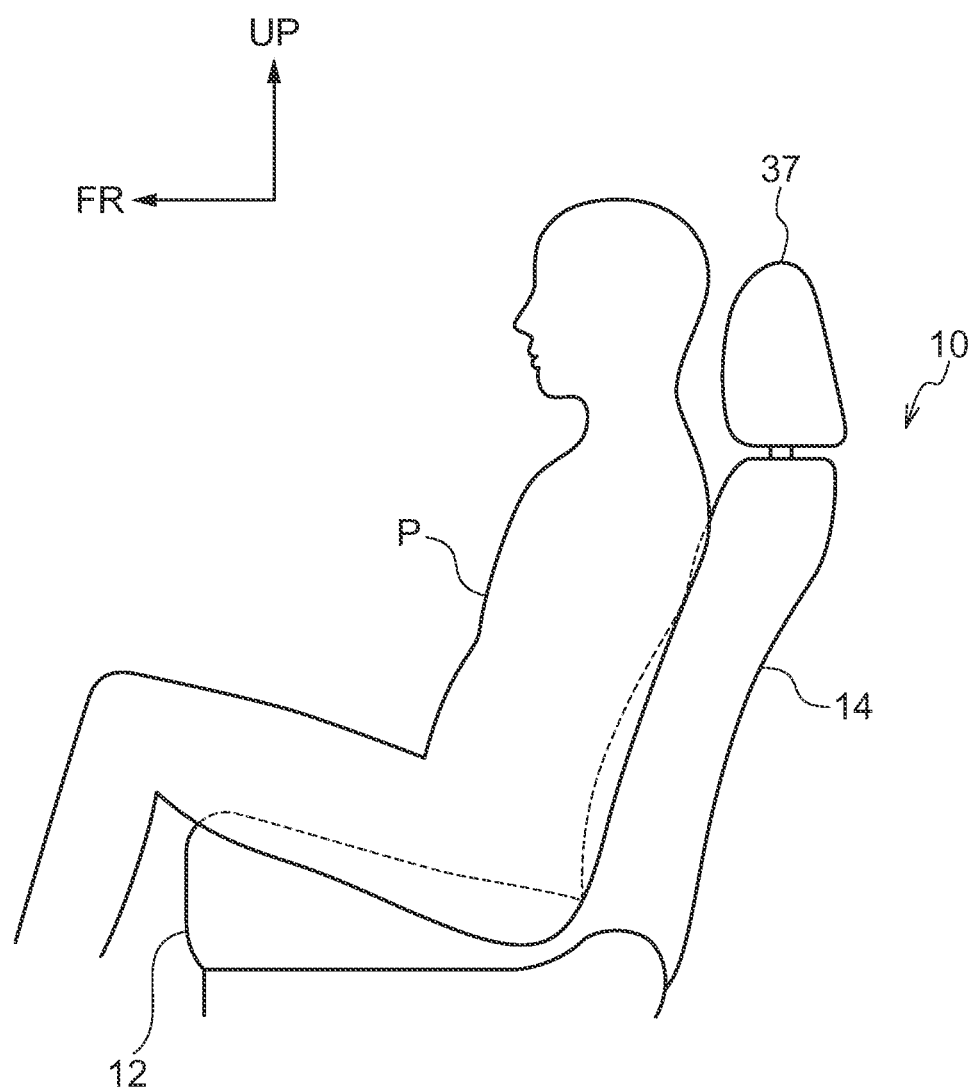
FIG. 6 is an explanatory view illustrating a vehicle seat according to the first exemplary embodiment of the present disclosure, with an occupant in a seated state.

As illustrated in FIG. 6, a vehicle seat 10 includes a seat cushion 12 on which an occupant P sits, and a seatback 14 that supports the back of the occupant P. The seat cushion 12 is coupled to a vehicle body floor through a known slide mechanism. A lower end section of the seatback 14 is coupled to a rear end section of the seat cushion 12.

Figure 1:
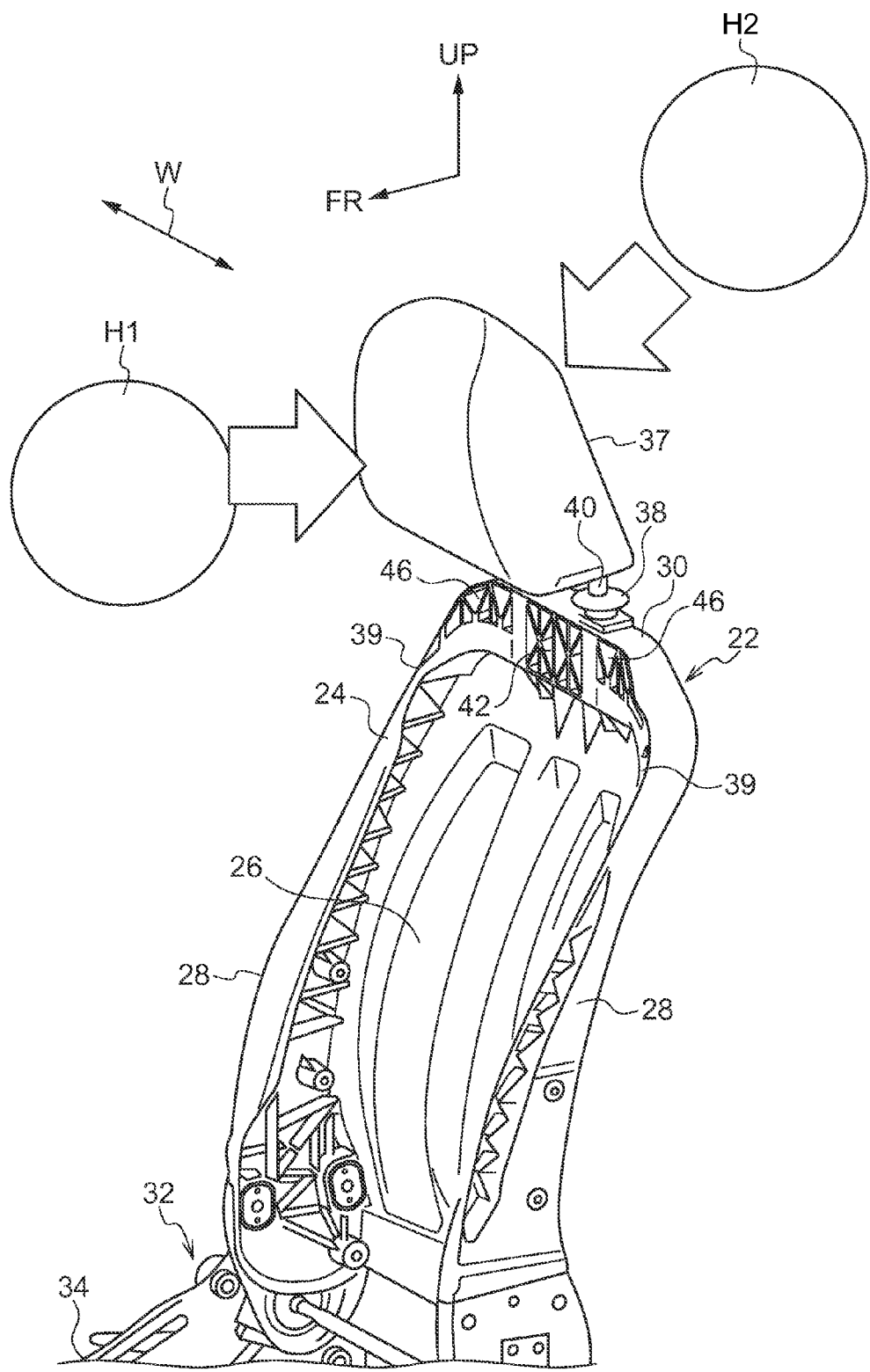
FIG. 1 is an explanatory perspective view illustrating a seatback frame according to a first exemplary embodiment of the present disclosure.

As illustrated in FIG. 1, a seatback frame 22, configuring a frame of the seatback 14, is formed inside the seatback 14. The seatback frame 22 is configured of resin (such as carbon fiber reinforced plastic), and is formed overall in what is referred to as a shell shape. Although there is no particular limitation to the resin employed for seatback frame 22, a resin that does not contain fiber materials, or a resin containing short fibers or long fibers, is preferable.

The seatback frame 22 includes a frame section 24 configuring an outer peripheral section of the seatback frame 22, and back face panel section 26 disposed inside the frame section 24. The frame section 24 and the back face panel section 26 are integrally molded of resin.

Figure 2:
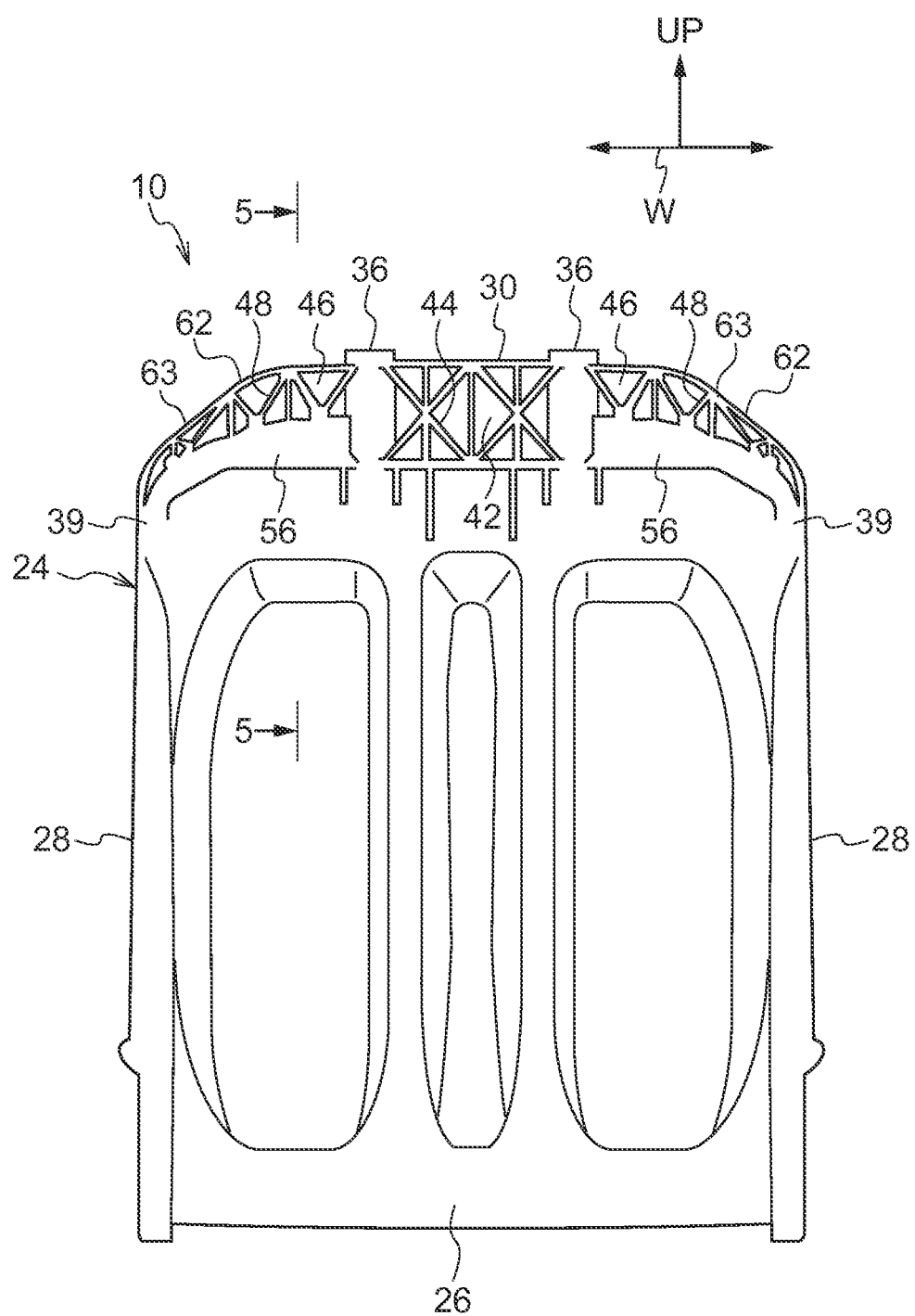
FIG. 2 is an explanatory front view illustrating a seatback frame according to the first exemplary embodiment of the present disclosure.

As illustrated in FIG. 1 and FIG. 2, the frame section 24 is formed in an inverted, substantially U-shape open toward the seat lower side in front view. The frame section 24 includes a pair of side frame sections 28 formed at both seat width direction end portions of the seatback frame 22, and an upper frame section 30 configuring an upper section of the seatback frame 22. Thus the back face panel section 26 is contiguous to the side frame sections 28 at both seat width direction end portions, and contiguous to the upper frame section 30 at the seat upper side.

The side frame sections 28 are each formed in a substantially plate shape, and extend along the seat up-down direction with their plate thickness direction along the seat width direction.

As illustrated in FIG. 1, a known reclining mechanism 32 is attached to lower end portions of the side frame sections 28. The lower end portions of the side frame sections 28 are coupled to a seat cushion frame 34 through the reclining mechanism 32.

Figure 3:
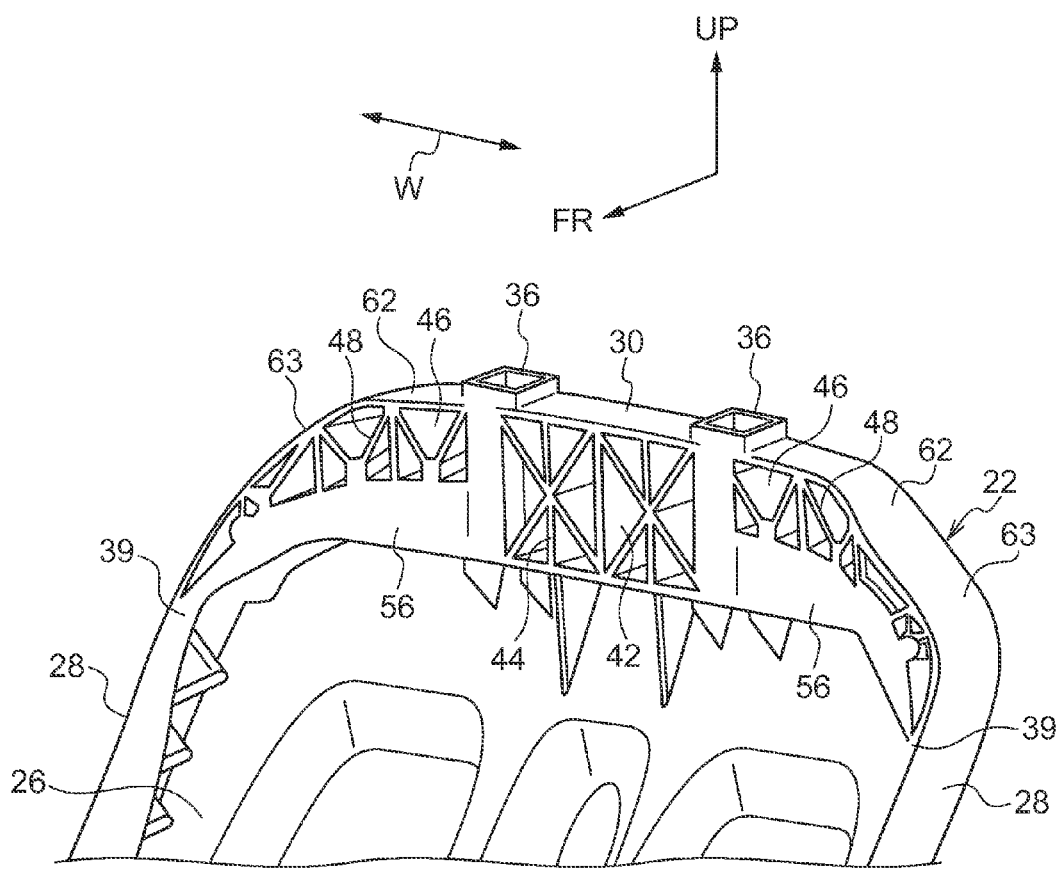
FIG. 3 is an explanatory perspective view illustrating relevant portions of a seatback frame according to the first exemplary embodiment of the present disclosure, viewed from the seat front side.

The upper frame section 30 is a substantially rectangular shaped body with a specific thickness in a cross-section along the seat front-rear direction, extends along the seat width direction, and is formed contiguous to upper ends of the side frame sections 28 at connecting portions 39 at both seat width direction ends of the upper frame section 30. On the seat front side of the seatback frame 22 as illustrated in FIG. 3, a pair of supporting portions 36, serving as headrest retaining portions, are formed at a seat width direction center side of the upper frame section 30. The supporting portions 36 are each formed as a tubular body with a rectangular shaped cross-section and its axial direction along the seat up-down direction. Grommets 38, supporting a headrest 37, are inserted inside the supporting portions 36, and stays 40 of the headrest 37 are inserted inside the grommets 38, such that the headrest 37 is supported by the seatback frame 22.

As illustrated in FIG. 3, a recessed portion 42, extending along the seat front-rear direction and open toward the seat front, is formed between the pair of supporting portions 36 of the upper frame section 30. The recessed portion 42 is divided into plural recessed portions by ribs 44 extending along the seat front-rear direction.

As illustrated in FIG. 3, recessed portions 46, extending along the seat front-rear direction at an upper tier side and open toward the seat front, are formed further toward respective seat width direction end portion (side frame section 28) sides of the upper frame section 30 than the pair of supporting portions 36. Each recessed portion 46 is divided into plural recessed portions by ribs 48 extending along the seat front-rear direction.

Figure 4:
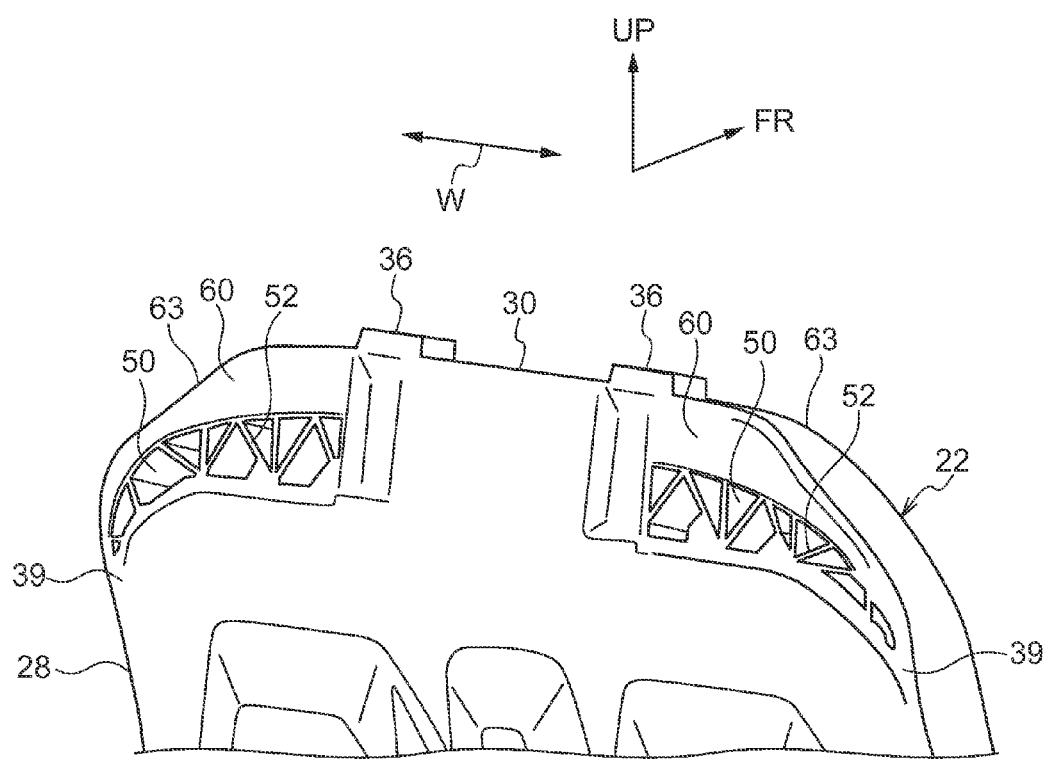
FIG. 4 is an explanatory perspective view illustrating relevant portions of a seatback frame according to the first exemplary embodiment of the present disclosure, viewed from the seat rear side.

On the seat rear side of the seatback frame 22 as illustrated in FIG. 4, recessed portions 50, extending along the seat front-rear direction and open toward the seat rear, are formed at a lower tier side of the upper frame portion 30, further to the side frame section 28 sides than the supporting portions 36. Each recessed portion 50 is divided into plural recessed portions by ribs 52 extending along the seat front-rear direction.

Figure 5:
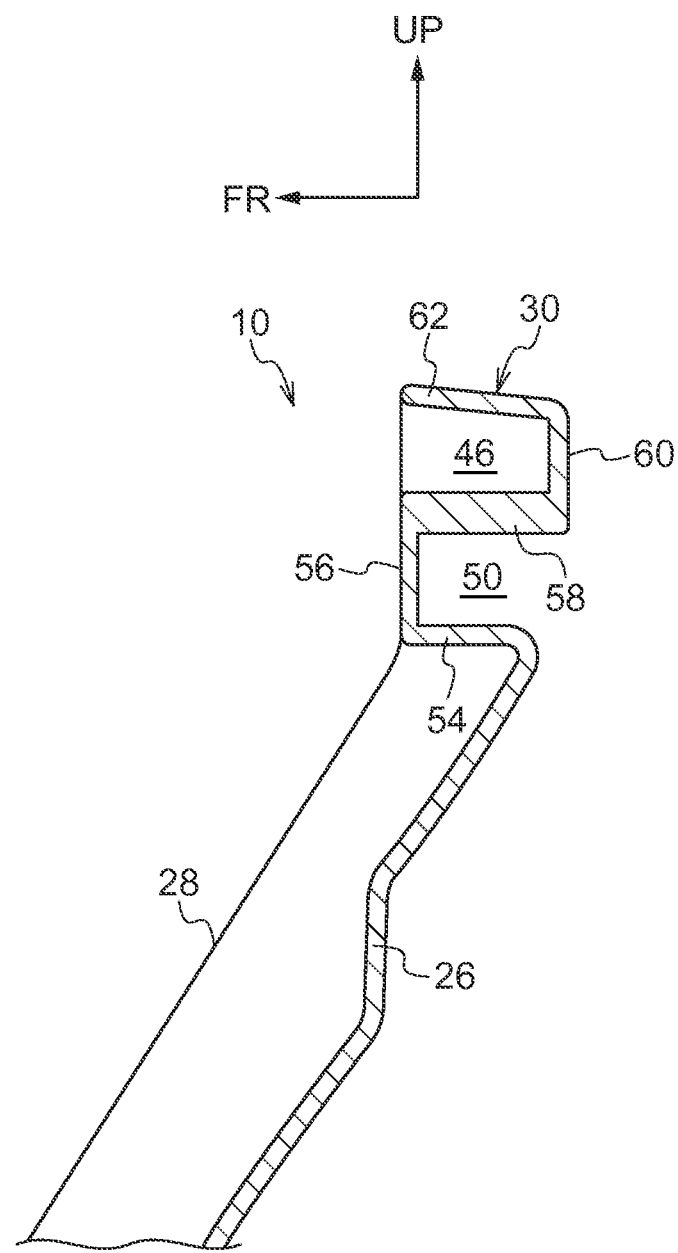
FIG. 5 is a cross-section taken along line 5-5 in FIG. 2.

As illustrated in FIG. 5, the upper frame section 30 includes a lower wall 54 of the upper frame section 30, extending from an upper end of the back face panel section 26 toward the seat front, front walls 56 extending from a seat front end of the lower wall 54 toward the seat upper side, partitioning walls 58 extending from seat upper ends of the front walls 56 toward the seat rear and partitioning between the upper tier recessed portions 46 and the lower tier recessed portions 50, rear walls 60 extending from seat rear ends of the partitioning walls 58 toward the seat upper side, and upper walls 62 extending from seat upper ends of the rear walls 60 toward the seat front.

Namely, the recessed portions 50 are configured by the lower wall 54, the front walls 56, and the partitioning walls 58, and the recessed portions 46 are configured by the partitioning walls 58, the rear walls 60, and the upper walls 62.

As illustrated in FIG. 3 and FIG. 4, the front walls 56 and the rear walls 60 are each formed as a contiguous face, extending from the supporting portions 36 as far as the respective seat width direction end portions (connecting portions 39).

Note that in the upper frame section 30, ranges from the supporting portions 36 as far as the respective seat width direction end portions (connecting portions 39), namely, ranges in which the recessed portions 46, 50 are divided into plural recessed portions), configure reinforcing sections 63.

Explanation follows regarding operation of the seatback frame 22 of the present exemplary embodiment. The operation is explained by first explaining a Comparative Example.

A seatback frame 100 according to the Comparative Example is similar to the seatback frame 22 according to the present exemplary embodiment, with the exception of an upper frame section 130. Thus configuration elements of the seatback frame 100 that are similar to those in the seatback frame 22 are appended with reference numerals that are the same reference numerals plus 100, and detailed explanation thereof is omitted.

Figure 9:
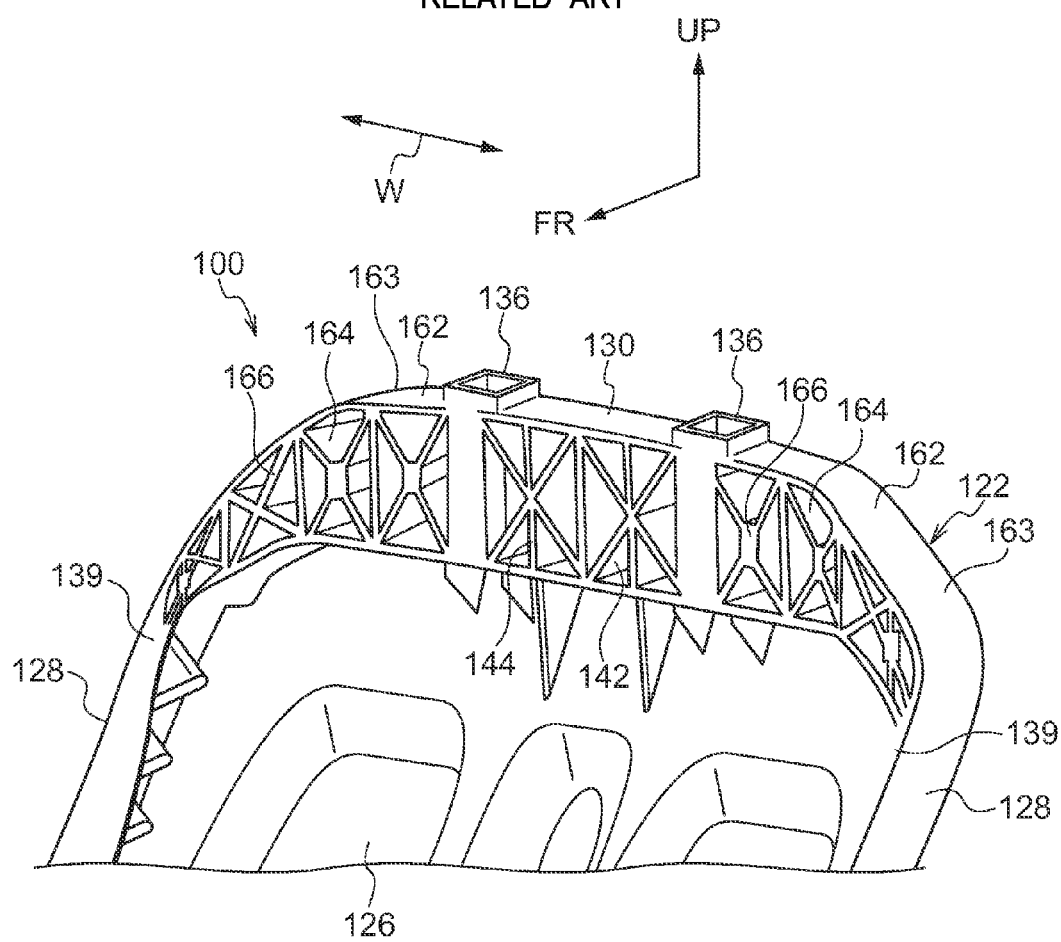
FIG. 9 is an explanatory perspective view illustrating relevant portions of a seatback frame according to a Comparative Example, viewed from the seat front side.
Figure 10:
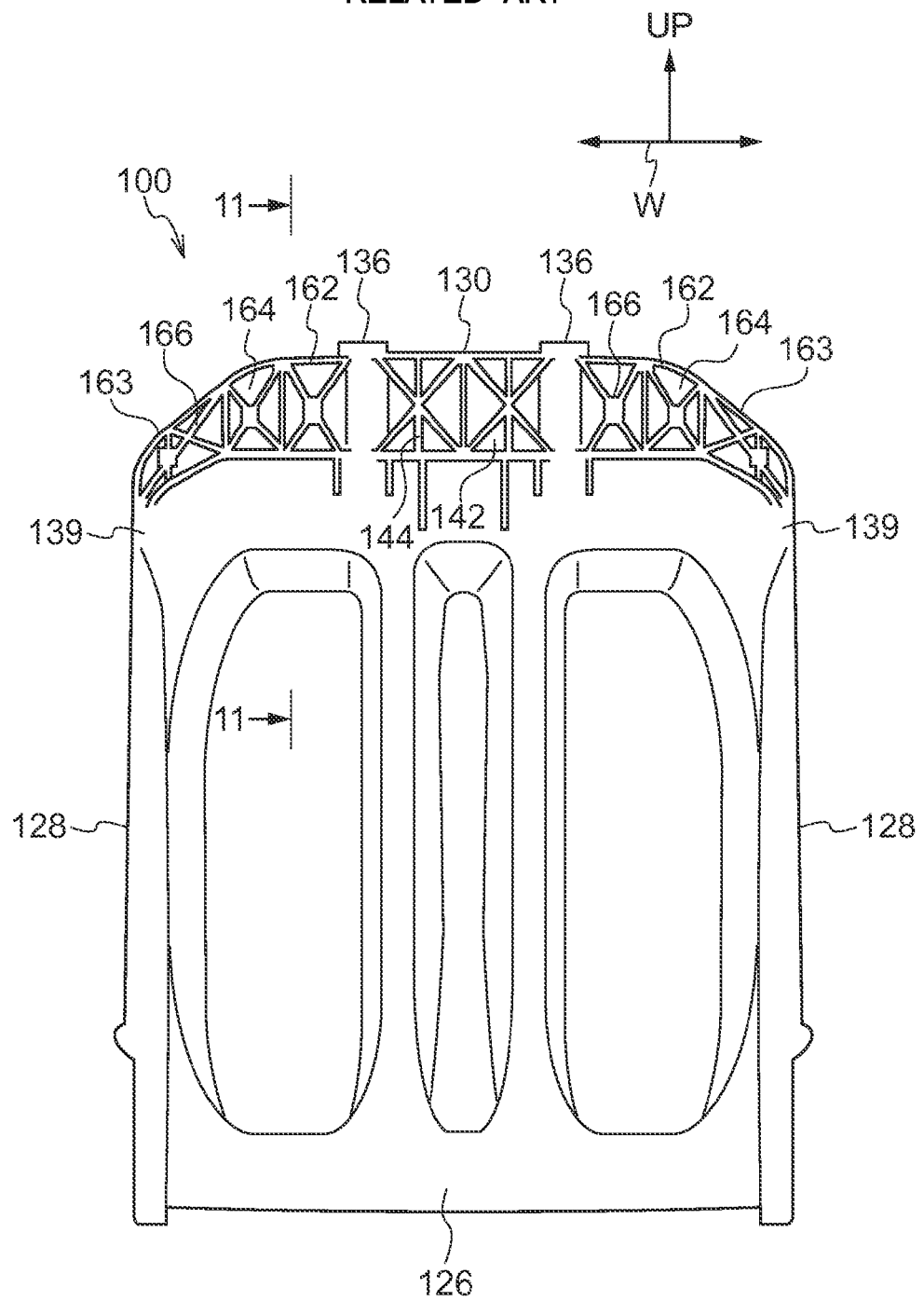
FIG. 10 is an explanatory front view illustrating a seatback frame according to a Comparative Example.
Figure 11:
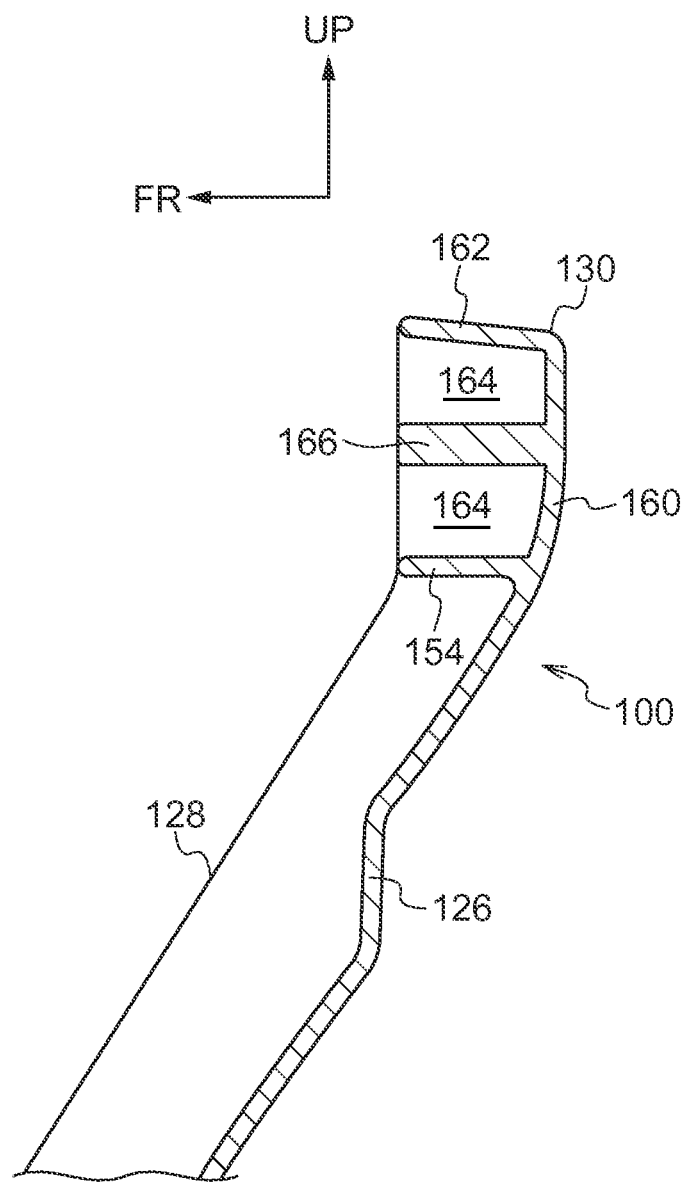
FIG. 11 is a cross-section taken along line 11-11 in FIG. 10.

As illustrated in FIG. 9 and FIG. 10, recessed portions 164, extending along the seat front-rear direction across entire regions of reinforcing sections 163 and open toward the seat front, are formed to the upper frame section 130. As illustrated in FIG. 11, each recessed portion 164 is formed of an upper wall 162, a lower wall 154, and a rear wall 160, and is divided into plural recessed portions by ribs 166 extending along the seat front-rear direction.

In the seatback frame 100 formed thus, the upper frame section 130 is reinforced by forming the plural ribs 166 to the recessed portions 164 of the upper frame section 130.

In the event of a rear-end collision of the vehicle with respect to the seatback frame 100 according to the Comparative Example configured thus, the head of the occupant P collides with a headrest (not illustrated in the drawings), such that moment from stays of the headrest acts on supporting portions 136 of the upper frame section 130. Thus load toward the seat rear is input to upper end sides of the supporting portions 136, and load toward the seat front acts is input to lower end sides of the supporting portions 136. These loads are transmitted from the upper frame section 130 (reinforcing sections 163), through side frame sections 128, to the seat cushion frame 34.

When this occurs in the upper frame section 130, load is mainly transmitted through the rear walls 160, and stress concentrates at the seat front side of the connecting portions 139 between the upper frame section 130 and the side frame sections 128.

In contrast thereto, in the seatback frame 22 according to the present exemplary embodiment, the recessed portions 46 open toward the seat front are formed at the upper tier side, and the recessed portions 50 open toward the seat rear are formed at the lower tier side, of the reinforcing sections 63 of the upper frame section 30. Namely, the reinforcing sections 63 are formed with the front walls 56 and the rear walls 60 extending continuously from the supporting portions 36 as far as the respective connecting portions 39.

Thus when the head H1 of the seated occupant P collides with the headrest 37 and moment acts on the supporting portions 36 of the seatback frame 22, and load toward the seat rear is input to the upper end side, and load toward the seat front is input to the lower end side, of the upper frame section 30 (reinforcing sections 63) during a rear-end collision of the vehicle, the respective loads are distributed at the rear walls 60 and the front walls 56, thereby enabling stress to be suppressed from concentrating at the connecting portions 39.

In particular, since the front walls 56 and the rear walls 60 are continuously formed from the supporting portions 36 as far as the respective connecting portions 39, load can be more effectively distributed, and stress can be further suppressed from concentrating at the connecting portions 39.

Since the front walls 56 are formed at the lower tier, and the rear walls 60 are formed at the upper tier, of the reinforcing sections 63, the respective front walls 56 and rear walls 60 are formed at positions corresponding to positions of load toward the seat front acting on the lower ends of the reinforcing sections 63, and to load toward the seat rear acting on the upper ends of the reinforcing sections 63, thereby enabling load input to the reinforcing sections 63 to be more effectively distributed. Thus stress is further suppressed from concentrating at the connecting portions 39 between the upper frame section 30 and the side frame sections 28.

In the seatback frame 22, since the back face panel section 26 is formed continuously with the upper frame section 30, part of the load input from the headrest 37 to the upper frame section 30 (reinforcing sections 63) is transmitted to the back face panel section 26, such that stress is further suppressed from concentrating at the connecting portions 39 between the upper frame section 30 and the side frame sections 28.

In the seatback frame 22, since the upper frame section 30 including the supporting portions 36 and the reinforcing sections 63, and the side frame sections 28, are integrally molded of resin, a concentration of stress can be effectively suppressed from occurring in the seatback frame 22.

As illustrated in FIG. 5, since the recessed portions 46, which are open toward the seat front at the upper tier side, are formed from the supporting portions 36 as far as the respective seat width direction end portions of the upper frame section 30, resin molding to form curves at a seat rear side upper end of the upper frame section 30 (corner portions between the rear walls 60 and the upper walls 62) enables interior fittings requirements to be satisfied. In this regard, ECE (Economic Commission for Europe) Regulation No. 21 requires that no protrusion or edge that is dangerous to a passenger should exist at interior parts of a vehicle such as vehicle seats. Namely, interior fittings requirements can be satisfied simply by resin molding the seatback frame 22, without adding any special elements during resin molding.

In the present exemplary embodiment, the openings of the respective recessed portions 46, 50 are set in opposite directions at two tiers, these being the upper tier side and the lower tier side. However, three or more tiers may be set, as long as one recessed portion opens toward the opposite side to another recessed portion, and a recessed portion at an upper end opens toward the seat front side.

Although the present exemplary embodiment has been explained with regards to a rear-end collision of the vehicle, similar operation and advantageous effects are exhibited during a front-end collision of the vehicle. Namely, as illustrated in FIG. 1, when the head H2 of an occupant of a rear passenger seat collides with the headrest 37 obliquely from the seat upper rear, and load toward the seat front acts on a seat upper end side, and load toward the seat rear acts on a seat lower end side, of the upper frame section 30 (reinforcing sections 63) through the supporting portions 36 during a front-end collision of the vehicle, stress is suppressed from concentrating at the connecting portions 39, similarly to during a rear-end collision of the vehicle.

Second Exemplary Embodiment

Explanation follows regarding a seatback frame according to a second exemplary embodiment of the present disclosure. Configuration elements that are similar to those in the first exemplary embodiment are appended with the same reference numerals as in the first exemplary embodiment, and detailed explanation thereof is omitted. Note that in the present exemplary embodiment, the only practical difference to the first exemplary embodiment is an upper frame section, and so explanation is mainly regarding this point.

Recessed portions 72 and recessed portions 76 are formed (see FIG. 7) such that the orientation of their openings are the opposite to those of the recessed portions 46 formed at the upper tier, and the recessed portions 50 formed at the lower tier, of the upper frame section 30 of the first exemplary embodiment (see FIG. 5).

Namely, the recessed portions 72, which are open toward the seat rear and extend along the seat front-rear direction, are formed to the upper tier of the reinforcing sections 63 of the upper frame section 30 of a seatback frame 70. The recessed portions 72 are each divided into plural recessed portions by ribs 74 extending along the seat front-rear direction.

The recessed portions 76, which are open toward the seat front and extend along the seat front-rear direction, are formed to the lower tier of the reinforcing sections 63 of the upper frame section 30 of the seatback frame 70. The recessed portions 76 are each divided into plural recessed portions by ribs 78 extending along the seat front-rear direction.

Figure 7:
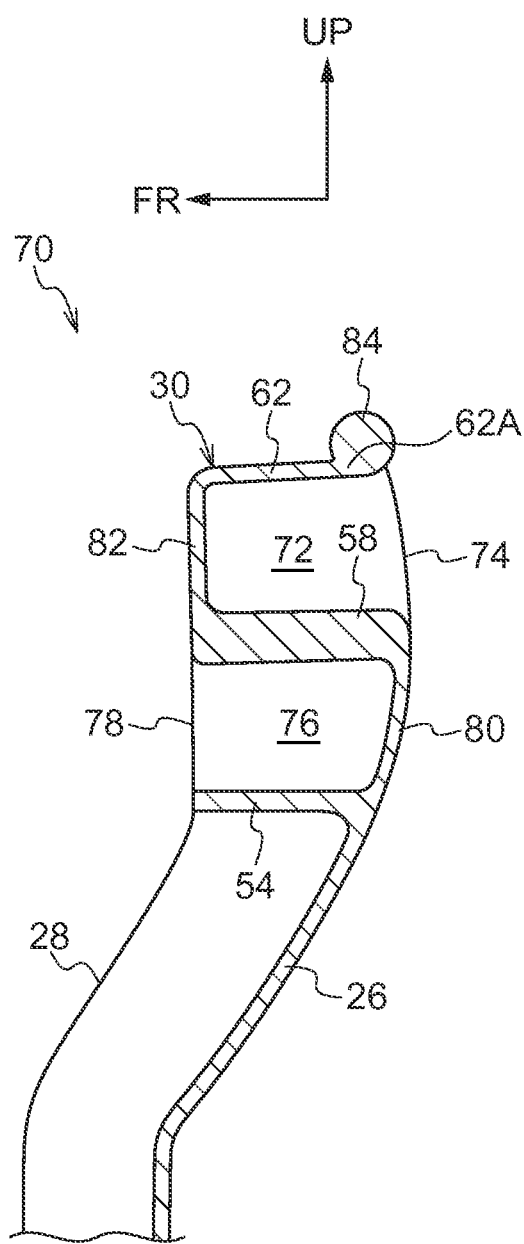
FIG. 7 is a cross-section illustrating relevant portions of a seatback frame according to a second exemplary embodiment of the present disclosure.

As illustrated in FIG. 7, each recessed portion 76 is configured by the lower wall 54, the partitioning wall 58, and a rear wall 80 contiguous to the back face panel section 26. Each recessed portion 72 is formed by the upper wall 62, the partitioning wall 58, and a front wall 82.

As illustrated in FIG. 7, a bead portion 84, which has a circular shape in a cross-section along the seat front-rear direction and extends along the seat width direction, is formed to a seat rear side end portion 62A of the upper wall 62 configuring each recessed portion 72 of the upper frame section 30.

Explanation follows regarding operation of the seatback frame 70.

The recessed portions 72 open toward the seat rear side at the upper tier, and the recessed portions 76 open toward the seat front side at the lower tier, are formed further to the respective seat width direction end portion (side frame section 28) sides of the seatback frame 70 than the pair of supporting portions 36 of the upper frame section 30.

Moment accordingly acts on the pair of supporting portions 36 of the upper frame section 30 through the stays 40 of the headrest 37 due the head H1 of the seated occupant colliding with the headrest 37 during a rear-end collision of the vehicle. Thus load toward the seat rear acts on the upper end side, and load toward the seat front acts on the lower end side, of the supporting portions 36 (upper frame section 30).

When this occurs, load is transmitted along the seat width direction in the upper frame section 30, and transmitted through the connecting portions 39 and the side frame sections 28 to the seat cushion frame 34.

Note that in the upper frame section 30, the front walls 82 are formed at the seat front side, and the rear walls 80 are formed at the seat rear side, of the reinforcing sections 63. Thus load toward the seat rear side, and load toward the seat front side, input to the upper frame section 30 (reinforcing sections 63) is distributed to the respective rear walls 80 and front walls 82, alleviating a concentration of stress at the connecting portions 39.

During a front-end collision of the vehicle, similar advantageous effects to those during a rear-end collision of the vehicle are exhibited. In addition, since the front walls 82 are formed at the seat upper end side where load acts toward the seat front side, and the rear walls 80 are formed at the seat lower end side where load acts toward the seat rear side, load input to the reinforcing sections 63 can be more effectively distributed, enabling stress to be further suppressed from concentrating at the connecting portions 39.

As illustrated in FIG. 7, since the bead portions 84 are formed to the seat rear side end portions 62A of the upper walls 62 configuring the recessed portions 72, even if the head H2 of an occupant seated in a rear passenger seat collides with the seatback 14 of a front passenger seat during a front-end collision of the vehicle, the possibility of being injured can be suppressed. Namely, interior fittings requirements can be satisfied.

Figure 8:
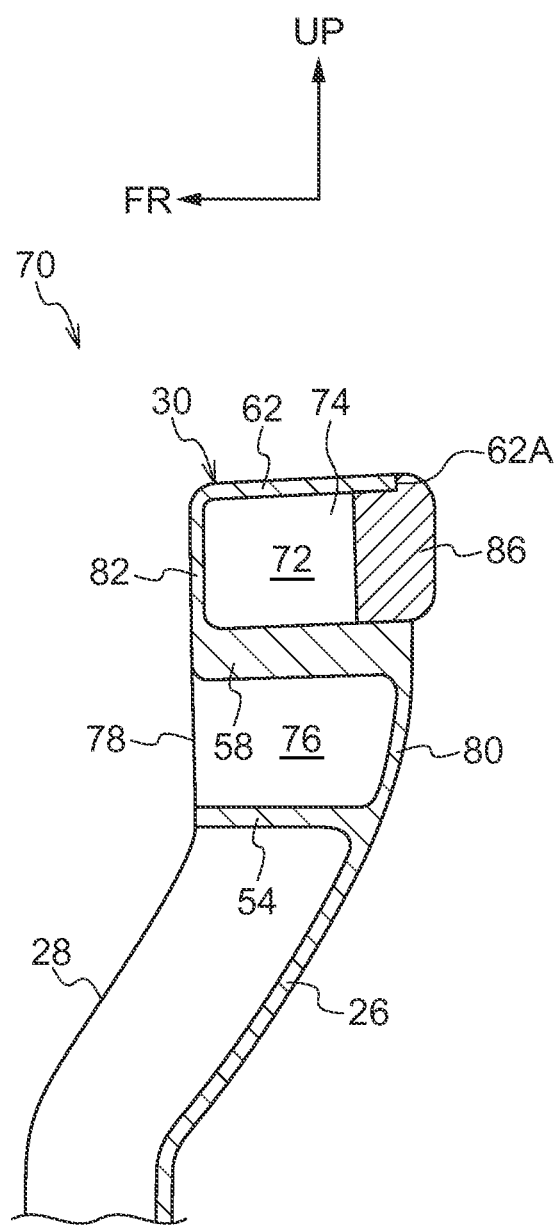
FIG. 8 is cross-section illustrating relevant portions of a seatback frame according to a modified example of the second exemplary embodiment of the present disclosure.

In the seatback frame 70 of the present exemplary embodiment, the bead portions 84 are provided to the seat rear side end portions 62A of the upper walls 62 of the upper frame section 30; however, if configuration enables pointed portions of the seat rear side end portions 62A to be eliminated, then there is no limitation thereto. As illustrated in FIG. 8, for example, a configuration may be applied in which, by fitting a resin fitting member 86 with a corner portion formed in a curved shape into each recessed portion 72, the fitting members 86 cover the seat rear side end portions 62A of the upper frame section 30.

What is claimed is:

1. A seatback frame that configures a frame of a seatback supporting the back of a seated occupant and is integrally formed by resin molding, the seatback frame comprising:
   an upper side frame section that includes a headrest retaining portion retaining a headrest, that is positioned at an upper end of the seatback frame, and that extends along a seat width direction;
   a pair of side frame sections that have upper sides connected to respective seat width direction end portions of the upper side frame section and that extend along a seat vertical direction of the seatback frame; and
   a reinforcing section that is formed in the upper side frame section by forming a plurality of recessed portions extending along a seat front-rear direction, at least from the headrest retaining portion to the seat width direction end portion,
   wherein more than one of the plurality of recessed portions are formed by being open toward a seat rear side and by providing a first wall face extending along the seat vertical direction at a seat front side, and
   wherein more than one of the plurality of recessed portions are formed by being open toward the seat front side and by providing a second wall face extending along the seat vertical direction at the seat rear side.

2. The seatback frame of claim 1, wherein the plurality of recessed portions are disposed in the reinforcing section along the seat vertical direction, and the more than one of the plurality of recessed portions open toward the seat front side are positioned at an upper end of the reinforcing section with the second wall face formed at the seat rear side.

3. The seatback frame of claim 1, wherein both the first wall face and the second wall face configuring the plurality of recessed portions of the reinforcing section are formed continuously from the headrest retaining portion toward the seat width direction end portion.

4. The seatback frame of claim 1, further comprising a back face panel section that extends along the seat width direction between the pair of side frame sections, wherein seat width direction end portions of the back face panel section are continuous with the side frame sections and a seat upper direction end portion of the back face panel section is continuous with the upper side frame section.

5. A resin for employing in a seatback frame and capable of producing a seatback frame that configures a frame of a seatback supporting the back of a seated occupant by integral molding, the seatback frame comprising:
   an upper side frame section that includes a headrest retaining portion retaining a headrest, that is positioned at an upper end of the seatback frame, and that extends along a seat width direction;
   a pair of side frame sections that are connected at an upper side to both seat width direction end portions of the upper side frame section and that extend along a seat vertical direction of the seatback frame; and
   a reinforcing section that is formed in the upper side frame section by forming a plurality of recessed portions extending along a seat front-rear direction, at least from the headrest retaining portion to the seat width direction end portion, wherein:
   more than one of the plurality of recessed portions is are formed by being open toward a seat rear side and by providing a first wall face extending along the seat vertical direction at a seat front side; and
   more than one of the plurality of recessed portions is are formed by being open toward the seat front side and by providing a second wall face extending along the seat vertical direction at the seat rear side.

6. The resin for employing in the seatback frame of claim 5, wherein the resin does not contain fiber material.

7. The resin for employing in the seatback frame of claim 5, wherein the resin contains short fibers or long fibers.

* * * * *

UNITED STATES PATENT AND TRADEMARK OFFICE
CERTIFICATE OF CORRECTION

PATENT NO. : 9,783,091 B2
APPLICATION NO. : 14/805227
DATED : October 10, 2017
INVENTOR(S) : Kenzo Yasuda It is certified that error appears in the above-identified patent and that said Letters Patent is hereby corrected as shown below:

In the Claims

In Column 10 at Line 46 (approx.), In Claim 5, change "is are" to --are--.

In Column 10 at Line 49 (approx.), In Claim 5, change "is are" to --are--.

Signed and Sealed this
Twenty-fourth Day of April, 2018

Andrei Iancu
*Director of the United States Patent and Trademark Office*